United States Patent [19]

Feathers

[11] 4,411,614
[45] Oct. 25, 1983

[54] REMOVABLE CONTOURED INSERT FOR AN EXTRUSION DIE

[75] Inventor: William D. Feathers, Towanda, Pa.

[73] Assignee: E. I. Du Pont de Nemours & Co., Wilmington, Del.

[21] Appl. No.: 349,988

[22] Filed: Feb. 18, 1982

[51] Int. Cl.³ .............................................. B29F 3/04
[52] U.S. Cl. .................................... 425/466; 118/412; 264/176 R; 264/216; 425/376 A; 425/381; 425/461; 425/467
[58] Field of Search ........... 425/461, 467, 466, 376 A, 425/381, 462; 264/176 R, 216; 118/412

[56] References Cited

U.S. PATENT DOCUMENTS

| | | | |
|---|---|---|---|
| 2,471,330 | 5/1949 | Knight et al. | 118/412 |
| 2,761,418 | 9/1956 | Russell | 118/412 |
| 3,241,183 | 3/1966 | Tyrner | 18/12 |
| 3,360,823 | 1/1968 | Tyrner | 18/12 |
| 3,608,040 | 9/1971 | Green | 264/176 |
| 3,684,422 | 8/1972 | Huesing | 425/461 |
| 3,859,031 | 1/1975 | Hawkins | 425/461 |
| 3,893,410 | 7/1975 | Herzhoff et al. | 118/412 |
| 3,903,843 | 9/1975 | Jones | 118/412 |
| 3,966,381 | 6/1976 | Suh | 425/461 |
| 4,043,739 | 8/1977 | Appel | 425/461 |
| 4,189,293 | 2/1980 | Ether | 425/461 |
| 4,259,055 | 3/1981 | O'Brien | 425/467 |
| 4,293,517 | 10/1981 | Knox | 425/461 |

FOREIGN PATENT DOCUMENTS

| | | | |
|---|---|---|---|
| 1504354 | 9/1969 | Fed. Rep. of Germany | 425/461 |
| 397357 | 1/1974 | U.S.S.R. | 425/461 |

*Primary Examiner*—Jeffery R. Thurlow

[57] ABSTRACT

An insert is sized for close-fitting reception into either a distribution channel or a standardized receptacle formed in an extrusion coating die to define a distribution channel dedicated to a particular coating fluid.

6 Claims, 12 Drawing Figures

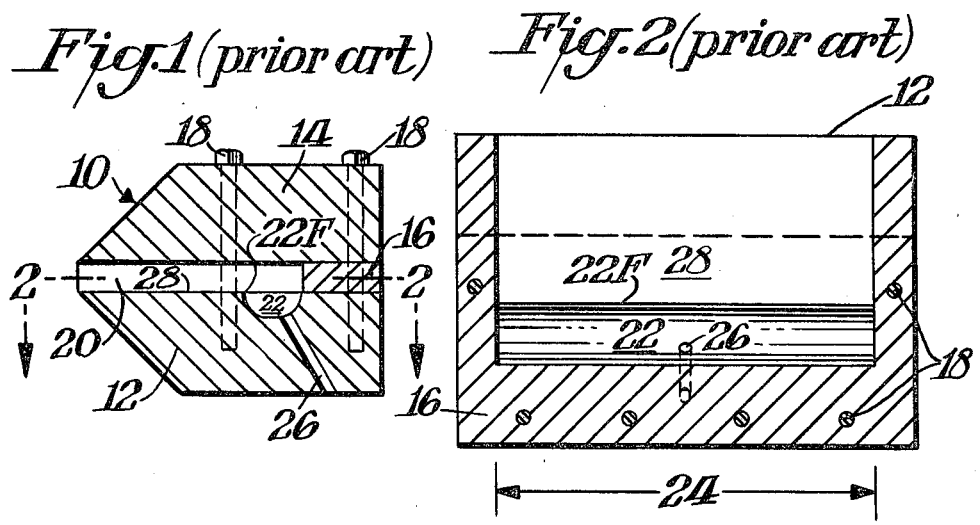
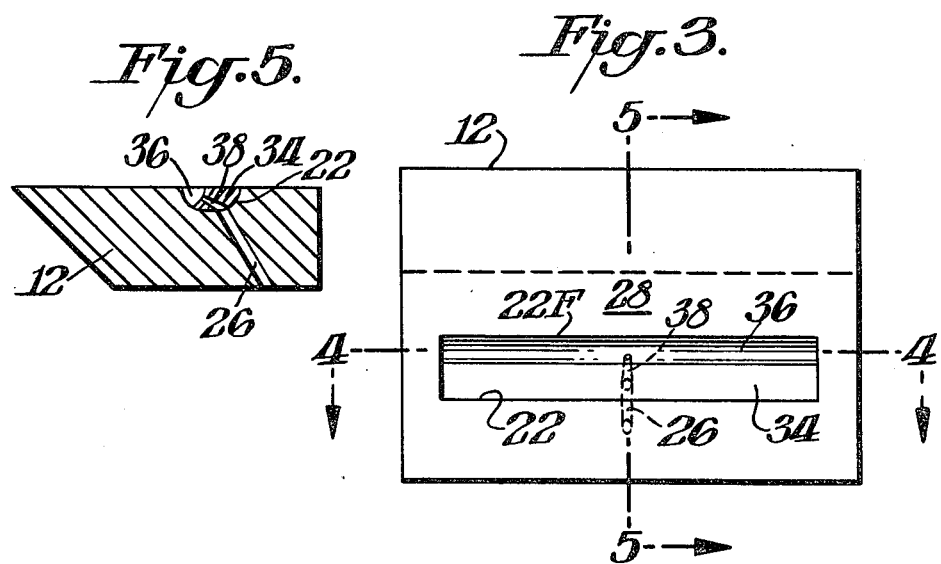
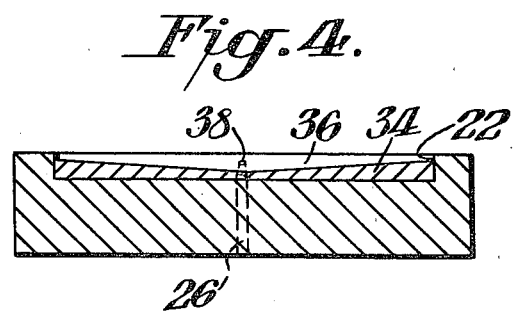

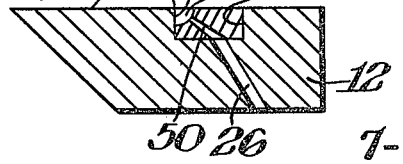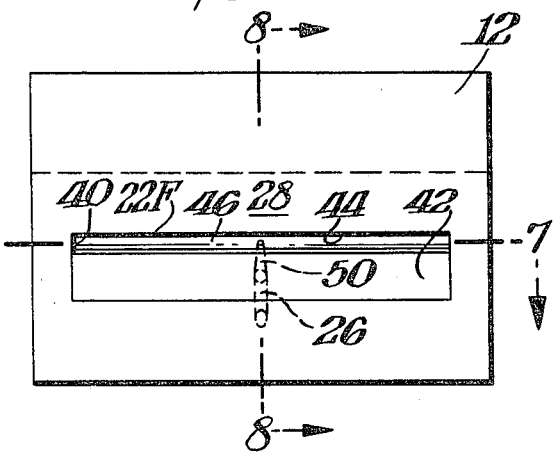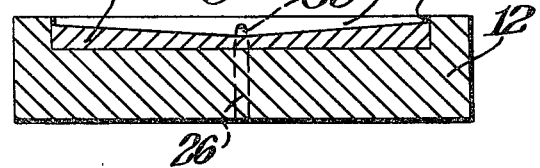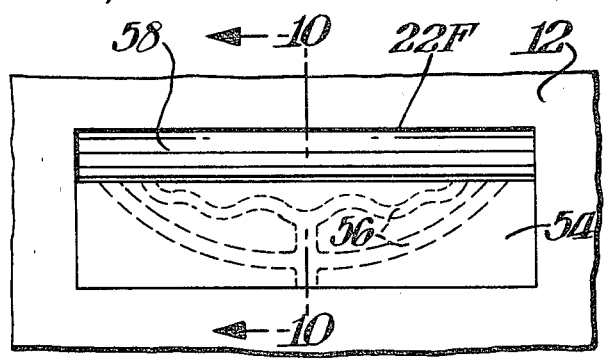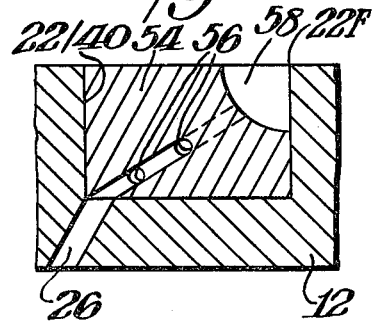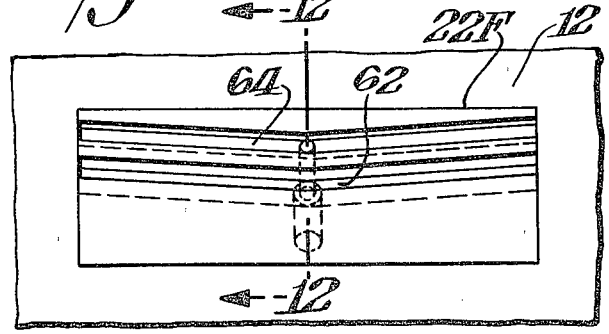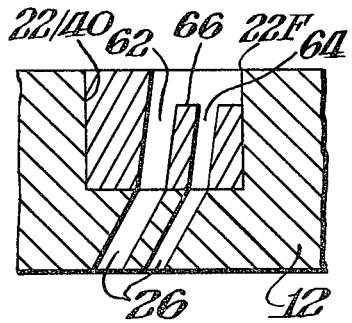

REMOVABLE CONTOURED INSERT FOR AN EXTRUSION DIE

BACKGROUND OF THE INVENTION

This invention relates in general to extrusion coating apparatus and, in particular, to an insert usable in an extrusion coating die to modify a distribution channel formed therein.

An extrusion coating apparatus for coating a fluid onto the surface of a web typically comprises at least two members, called "dies". The dies, which are relatively massive dimensionally stable members, are formed of a chemically inert material and are disposed oppositely relative to each other to define an extrusion slot therebetween through which the coating fluid is extruded onto the surface of a web. The dies are typically fabricated of stainless steel although other materials may be used. At least one of the dies has an opening, called the distribution channel, formed therein which extends transversely across a portion thereof. The distribution channel communicates both with the extrusion slot and with a source of coating fluid through a feed passage extending through the body of the die.

In order that the coating fluid exit the mouth of the slot and deposit in a uniform manner across the transverse dimension of the web, the distribution channel must be optimally configured so as to avoid flow discontinuities as the coating fluid is extruded from the slot.

To achieve this optimum configuration the distribution channel must be machined to close tolerances, e.g., on the order of ten-thousandths of an inch. Machining such a relatively massive stainless steel member as an extrusion die to such a high degree of tolerance is expensive. In addition, once a die has been machined to provide the optimum configuration for a coating fluid, the die is not readily adaptable for optimal use with a different fluid since the flow properties of different coating fluids necessitate different cross-sectional configurations of the distribution channel. Therefore, it is either necessary to dedicate an individual die for use in coating a particular fluid onto a web or to machine a distribution channel into a die so that the die may be used to coat more than one fluid. The first expedient is expensive while the second implies a comprise in the configurations of the distribution channels for each of the fluids used.

Accordingly, in view of the foregoing, it is believed to be desirable to provide an arrangement wherein the same coating die may be utilized with a variety of coating fluids and yet the distribution channel in the die is modifiable to permit the die to conform to the optimum configuration for each particular coating fluid used with the die.

SUMMARY OF THE INVENTION

This invention relates to an insert able to be introduced into a cavity, either into a distribution channel already formed in a die or a suitably shaped receptacle provided in the extrusion die, which insert, when disposed within the cavity, defines a dedicated, contoured distribution channel optimized for a particular coating fluid.

In one embodiment of the invention the insert is sized for close-fitting insertion into a flow distribution channel already formed in the die. A boundary of the flow distribution channel defines a forward edge of an essential land on the extrusion die. The insert is sized so as to partially fill the distribution channel which is optimized for a first coating fluid to define a second flow distribution channel having a second predetermined shape optimized for a second coating fluid. The boundary of the second flow distribution channel maintains the same forward edge on the die. The insert has an opening which permits the second distribution channel to communicate with a feed passage formed in the die.

In an alternate embodiment of the invention the insert is sized for introduction into a receptacle of standardized geometry formed in the die. One boundary of the receptacle defines a forward edge of an essential land on the extrusion die. Once in place, the insert may cooperate with a boundary wall of the receptacle to define a predetermined dedicated distribution channel. The insert has an opening which permits the distribution channel formed therein to communicate with the feed passage.

BRIEF DESCRIPTION OF THE DRAWINGS

The invention may be more fully understood from the following detailed description thereof taken in connection with the accompanying drawings which form a part of this application and in which:

FIGS. 1 and 2 are, respectively, a side elevation view entirely in section and a top view taken along view lines 2—2 in FIG. 1 illustrating an extrusion coating apparatus of the prior art;

FIGS. 3, 4 and 5 are, respectively, a plan view, a front section and a side section view of an extrusion die having an insert received in the distribution channel thereof to define a second distribution channel optimized for a given coating solution in accordance with one embodiment of the invention;

FIGS. 6, 7 and 8 are, respectively, a plan view, a front section and a side section view of an extrusion die having a receptacle of standardized geometry and having an insert received therein in accordance with a second embodiment of the invention;

FIGS. 9 and 10, and 11 and 12 are, respectively, enlarged plan and side section views of alternate insert configurations useful in either embodiment of the invention.

DETAILED DESCRIPTION OF THE INVENTION

Throughout the following detailed description similar reference characters refer to similar elements in all figures of the drawings.

With reference to FIGS. 1 and 2, shown in a side elevation entirely in section and in a top view taken along view lines 2—2 in FIG. 1 is an extrusion apparatus generally indicated by reference character 10. The extrusion apparatus 10 is formed of a first extrusion die member 12 and a second extrusion die 14. The extrusion dies 12 and 14 are relatively massive, dimensionally stable members fabricated of a chemically inert material, such as stainless steel. Of course, other suitable dimensionally stable chemically inert materials may be used. The dies 12 and 14 are spaced apart from each other by suitable spacers or shims 16 and are secured by bolts 18. When so assembled, the dies 12 and 14 cooperate with each other to define an extrusion slot 20. At least one of the dies 12 or 14 is provided with a cavity, usually in the form of a dedicated distribution channel 22 which extends a predetermined transverse distance 24 (FIG. 2) across the die. The distribution channel 22 is provided with an inlet passage 26 through which coating fluid is introduced from a source thereof into the distribution channel 22. The distribution channel 22 is configured so that coating fluid uniformly emanates over the forward edge 22F of the channel 22 onto an essential land 28 on the die lying downstream thereof in a transversely uniform manner. The essential land 28 on the die 12 is a highly finished planar surface which together with a corresponding essential land on the die 14 defines the extrusion slot 20 through which the coating fluid flow onto a surface to be coated. It is important that the essential lands be free of irregularities in order to avoid coating defects. The coating fluid then flows through the slot 20 onto the surface of a web (not shown) drawn past the mouth of the extrusion slot 20. The distribution channel 22 is machined to exhibit first predetermined configuration that is optimized for compatibility with the flow characteristics of a particular coating fluid being used with the die.

However, as explained earlier, since different coating fluids exhibit different flow characteristics, a distribution channel optimized for a given coating fluid is not necessarily optimal for use with a different coating fluid. Accordingly, if it is desired to coat most advantageously different coating fluids onto a web, it is necessary to provide a die having a distribution channel optimized for use with each fluid being coated. However, since it is costly to machine a die, this alternative is not economically favored.

In accordance with this invention, an extrusion apparatus may be interchangeably adapted to coat different coating fluids through the use of an insert adapted to be interchangeably introduced into one die of the apparatus to define a dedicated distribution channel optimized for the flow characteristics of a given coating fluid. In the embodiment of the invention shown in FIGS. 3, 4 and 5, an insert 34 is shaped for insertion into a close-fitting relationship with a cavity, such as a flow distribution channel 22 already machined into the die. The insert 34 is formed of a material which is chemically inert with respect to the coating solution and exhibits reasonable dimensional stability at the temperature at which it is being used. For example, the insert may be fabricated of wood, a fluoropolymer material such as TEFLON fluorocarbon material, nylon or materials amenable to casting, such as epoxies, or of easily machinable metals such as aluminum or lead. The insert 34 is sized so as to partially fill the existing distribution channel 22 in the die when received therein. The insert 34 cooperates with the boundary of the distribution channel 22 to define a second distribution channel 36 which exhibits a second predetermined shape that is optimized for use with a different coating fluid. The boundary of the second flow distribution channel maintains the same forward edge 22F on the die. The insert 34 has an opening 38 communicating with both the inlet passage 26 and with the second distribution channel 36.

In accordance with an alternate embodiment of the invention shown in FIGS. 6, 7 and 8, the extrusion die has a cavity in the form of a receptacle 40 of standardized cross-sectional geometry (either rectangular, semicircular, or any other suitable configuration dependent upon various considerations, such as ease of machining) extending transversely across the die for a predetermined distance 24. One boundary wall 44 of the receptacle 40 defines the forward edge 22F of the essential land 28 on the die. An insert 42 is shaped for insertion into a close-fitting relationship with the receptacle 40. The insert 42, generally similar to the insert 34, is sized to fit within and to partially fill the receptacle 40. The insert 42 cooperates with the boundary wall 44 of the receptacle 40 having the forward edge 22F thereon to define a predetermined, dedicated distribution channel 46. The insert 42 is provided with an opening 50 adapted to communicate with the distribution channel 46 annd with the source of coating fluid through the inlet passage 26 in the die.

Shown in FIGS. 9 and 10 are an enlarged plan view and a side elevation view of an insert 54 useful with the invention heretofore discussed. In these Figures, the opening in the insert 54 is in the form of a plurality of feed passages 56 adapted to communicate with the distribution channel 58 and with the inlet passage 26 in the die. The passages 56 are arranged to open transversely along the distribution channel and to exhibit substantially equal flow lengths so that coating fluid passes through these passages and into the distribution channel 58 in approximately equal times. In FIGS. 11 and 12, shown are similar views of another embodiment of an insert 60 in which the opening therein is in the form of multiple feed openings 62 and 64. The openings 62 and 64 are arranged to lie in front of each other (in the direction of coating solution flow) and to communicate with the distribution channel 66 formed in the insert. When this insert is used, multiple inlet passages 26 are provided in the extrusion die. Although FIGS. 9 through 12 depict inserts 54 and 60 for use with a cavity of standardized geometry, it is to be understood that such inserts could be shaped to fit into and modify a die cavity in the form of an existing distribution channel.

Those skilled in the art having the benefit of the teachings hereinabove set forth may effect numerous modifications thereto. These modifications are to be construed as lying within the scope of the instant invention as defined in the appended claims.

What is claimed is:

1. In an extrusion die of the type having a flow distribution channel with a boundary defining a forward edge of an essential land, the channel exhibiting a first predetermined shape and having an inlet passage communicating therewith, the improvement which comprises:

an insert shaped for insertion into a close-fitting relationship with the flow distribution channel, the insert being sized so as to partially fill the flow distribution channel when received therein to define a second flow distribution channel having a second predetermined shape with the boundary of the second flow distribution channel maintaining the same forward edge on the die, the insert having an opening communicating with both the second flow distribution channel and with the inlet passage.

2. In an extrusion die of the type having a receptacle of standardized geometry formed therein, one boundary of the receptacle defining a forward edge of an essential land, an inlet passage for introducing a coating material, the improvement which comprises:

an insert shaped for insertion into a close-fitting relationship with the receptacle, the insert partially filling the receptacle and cooperating with the boundary defining the forward edge of the essential land to define a distribution channel having a predetermined shape, the insert having an opening communicating with both the distribution channel and with the inlet passage.

3. The extrusion die of claims 1 or 2 wherein the opening in the insert is in the form of a plurality of feed passages adapted to communicate with the distribution channel and with the inlet passage in the die.

4. The extrusion die of claim 3 wherein each of the plurality of feed passages communicate with the distribution channel transversely therealong.

5. The extrusion die of claim 3 wherein the plurality of feed passages communicate with the distribution channel one behind the other in the direction of coating fluid flow.

6. The extrusion die of claim 4 wherein the fluid flow length of each of the plurality of feed passages is substantially equal.

* * * * *